US012094307B2

(12) United States Patent
Carlson et al.

(10) Patent No.: US 12,094,307 B2
(45) Date of Patent: Sep. 17, 2024

(54) METHOD OF INSTALLING A SECURITY ALARM SYSTEM AND WIRELESS ACCESS POINT

(71) Applicant: 1010210 B.C. Ltd., Surrey (CA)

(72) Inventors: Julian Paul Carlson, Surrey (CA); Paul Justin Carlson, Surrey (CA)

(73) Assignee: 1010210 B.C. LTD., Surrey (CA)

( * ) Notice: Subject to any disclaimer, the term of this patent is extended or adjusted under 35 U.S.C. 154(b) by 0 days.

(21) Appl. No.: 18/337,994

(22) Filed: Jun. 20, 2023

(65) Prior Publication Data

US 2023/0334965 A1 Oct. 19, 2023

Related U.S. Application Data

(60) Division of application No. 17/343,572, filed on Jun. 9, 2021, now Pat. No. 11,749,077, which is a (Continued)

(51) Int. Cl.
*G08B 25/10* (2006.01)
*G08B 13/14* (2006.01)
(Continued)

(52) U.S. Cl.
CPC ... *G08B 13/1436* (2013.01); *G08B 13/19697* (2013.01); *G08B 19/005* (2013.01); (Continued)

(58) Field of Classification Search
CPC .......... G08B 13/1436; G08B 13/19697; G08B 19/005; G08B 29/06; G08B 29/16
See application file for complete search history.

(56) References Cited

U.S. PATENT DOCUMENTS 3,986,183 A 10/1976 Fujiwara
4,296,410 A 10/1981 Higgs et al.
(Continued)

FOREIGN PATENT DOCUMENTS

CA 3100201 A1 11/2019
CN 201780643 U 3/2011
(Continued)

OTHER PUBLICATIONS

Vision Security: "Installation & Operation Manual ZD 2012", published Feb. 10, 2011.
(Continued)

*Primary Examiner* — Nay Tun
(74) *Attorney, Agent, or Firm* — Nicholas Garner; Oyen Wiggs Green & Mutala LLP

(57) ABSTRACT

There is provided a method of installing a wireless access point so as to inhibit detection thereof within the interior of a home. The method includes disconnecting one of a doorbell chime, a smoke detector and a carbon monoxide detector of a building from existing wiring thereof. The method includes removing from one or more existing locations thereof the one or more of the doorbell chime, smoke detector and carbon monoxide detector. The method includes installing in the one or more existing locations the wireless access point. The method includes connecting the existing wiring to the wireless access point so as to receive power therefrom. The method includes providing the wireless access point with backup power in the form of a battery. The method includes operatively connecting a plurality of door sensors, a plurality of window sensors and one or more motion detectors to the wireless access point.

19 Claims, 7 Drawing Sheets

Related U.S. Application Data continuation of application No. PCT/CA2019/051771, filed on Dec. 9, 2019.

(60) Provisional application No. 62/777,695, filed on Dec. 10, 2018.

(51) Int. Cl.
*G08B 13/196* (2006.01)
*G08B 19/00* (2006.01)
*G08B 29/06* (2006.01)
*G08B 29/16* (2006.01)

(52) U.S. Cl.
CPC ............. *G08B 29/06* (2013.01); *G08B 29/16* (2013.01); *G08B 25/10* (2013.01)

(56) References Cited

U.S. PATENT DOCUMENTS

| | | | |
|---|---|---|---|
| 4,954,812 | A | 9/1990 | Lebron |
| 5,164,705 | A | 11/1992 | Dunagan et al. |
| D354,925 | S | 1/1995 | Eggers et al. |
| 5,434,500 | A | 7/1995 | Hauck et al. |
| D383,078 | S | 9/1997 | Carmi |
| 5,714,932 | A | 2/1998 | Castellon et al. |
| 5,784,446 | A | 7/1998 | Stuart |
| 5,905,787 | A | 5/1999 | Stuart |
| D417,165 | S | 11/1999 | Takeda et al. |
| 6,057,764 | A | 5/2000 | Williams |
| D429,696 | S | 8/2000 | Taylor |
| D434,387 | S | 11/2000 | Taylor |
| 6,185,294 | B1 | 2/2001 | Chornenky et al. |
| 6,400,267 | B1 | 6/2002 | Gordon-Levitt et al. |
| 6,519,208 | B2 | 2/2003 | Devries |
| 6,577,238 | B1 | 6/2003 | Whitesmith et al. |
| 7,023,327 | B1 | 4/2006 | Chen |
| 7,079,034 | B2 | 7/2006 | Stilp |
| 7,135,959 | B2 | 11/2006 | Wagner et al. |
| 7,221,230 | B2 | 5/2007 | Partridge et al. |
| D561,058 | S | 2/2008 | Taylor |
| 7,417,535 | B2 | 8/2008 | Mathews et al. |
| 7,785,138 | B2 | 8/2010 | Bonnassieux et al. |
| 8,410,937 | B2 | 4/2013 | Collins |
| 8,504,103 | B2 | 8/2013 | Ficquette |
| D708,976 | S | 7/2014 | Moeller |
| 8,773,263 | B2 | 7/2014 | Thibault |
| D713,277 | S | 9/2014 | Hasegawa et al. |
| 8,933,789 | B1 | 1/2015 | Fink et al. |
| 9,060,104 | B2 | 6/2015 | Scalisi |
| 9,113,051 | B1 | 8/2015 | Scalisi |
| 9,179,108 | B1 | 11/2015 | Scalisi et al. |
| D744,883 | S | 12/2015 | Roberts et al. |
| 9,245,439 | B2 | 1/2016 | Lamb et al. |
| D764,335 | S | 8/2016 | Thornton et al. |
| D778,184 | S | 2/2017 | Kikstra et al. |
| D782,349 | S | 3/2017 | Konotopskyi et al. |
| 9,589,446 | B1 | 3/2017 | Dey et al. |
| D783,542 | S | 4/2017 | Marsden |
| 9,659,470 | B2 | 5/2017 | Smith |
| D788,610 | S | 6/2017 | Venth et al. |
| D788,625 | S | 6/2017 | Hsieh et al. |
| 9,695,015 | B1 | 7/2017 | Marinelli |
| D796,975 | S | 9/2017 | Jou et al. |
| 9,767,660 | B1 | 9/2017 | Skarda |
| 9,799,182 | B1 | 10/2017 | Modi et al. |
| 9,905,099 | B2 | 2/2018 | Carlson et al. |
| 9,927,301 | B2 | 3/2018 | Peterson |
| 9,959,745 | B2 | 5/2018 | Lamb et al. |
| D826,941 | S | 8/2018 | Zhou et al. |
| 10,062,533 | B2 | 8/2018 | Qureshi et al. |
| 10,070,058 | B2 | 9/2018 | Siminoff et al. |
| 10,072,985 | B2 | 9/2018 | Peterson |
| D841,504 | S | 2/2019 | Alvarado et al. |
| 10,249,161 | B2 | 4/2019 | Carlson |
| D848,293 | S | 5/2019 | Laurans et al. |
| 10,290,447 | B2 | 5/2019 | Qureshi et al. |
| D852,071 | S | 6/2019 | Laurans et al. |
| D852,074 | S | 6/2019 | Laurans et al. |
| 10,319,213 | B1 | 6/2019 | Conner et al. |
| 10,622,770 | B2 | 4/2020 | Parks |
| D892,659 | S | 8/2020 | Carlson et al. |
| 11,295,584 | B2 | 4/2022 | Carlson et al. |
| 11,341,829 | B2 | 5/2022 | Carlson et al. |
| 11,557,184 | B2 | 1/2023 | Fisher |
| 11,645,897 | B2 | 5/2023 | Carlson et al. |
| 11,657,687 | B2 | 5/2023 | Thibault |
| 11,749,077 | B2 | 9/2023 | Carlson et al. |
| 11,783,655 | B1 | 10/2023 | Else et al. |
| 2001/0030605 | A1 | 10/2001 | Novotny |
| 2002/0086567 | A1 * | 7/2002 | Cash, Jr. ............. H01R 25/006 439/106 |
| 2004/0085205 | A1 | 5/2004 | Yeh |
| 2004/0095254 | A1 | 5/2004 | Maruszczak |
| 2004/0121648 | A1 | 6/2004 | Voros |
| 2004/0178889 | A1 | 9/2004 | Buckingham et al. |
| 2004/0182096 | A1 | 9/2004 | Alles |
| 2004/0260407 | A1 | 12/2004 | Wimsatt |
| 2005/0024207 | A1 | 2/2005 | Schebel et al. |
| 2005/0096587 | A1 | 5/2005 | Santini et al. |
| 2005/0125083 | A1 | 6/2005 | Kiko |
| 2005/0152323 | A1 | 7/2005 | Bonnassieux et al. |
| 2005/0161517 | A1 * | 7/2005 | Helt ......................... F24F 11/30 236/1 C |
| 2005/0179545 | A1 | 8/2005 | Bergman et al. |
| 2005/0248443 | A1 | 11/2005 | Steinetz et al. |
| 2006/0071762 | A1 | 4/2006 | Lombardo |
| 2007/0052531 | A1 | 3/2007 | Mathews et al. |
| 2007/0279226 | A1 | 12/2007 | Whitesmith et al. |
| 2008/0290864 | A1 | 11/2008 | Latraverse |
| 2008/0297339 | A1 | 12/2008 | Mathews et al. |
| 2009/0042604 | A1 | 2/2009 | Ficquette |
| 2009/0201160 | A1 | 8/2009 | Acrey |
| 2009/0201209 | A1 | 8/2009 | Boyle |
| 2010/0102907 | A1 | 4/2010 | Schebel et al. |
| 2011/0004916 | A1 | 1/2011 | Schiffman et al. |
| 2011/0057788 | A1 | 3/2011 | Talkington et al. |
| 2011/0106996 | A1 | 5/2011 | Rosso |
| 2011/0156905 | A1 | 6/2011 | Collins |
| 2012/0089299 | A1 | 4/2012 | Breed |
| 2012/0293310 | A1 | 11/2012 | Fitzgibbon et al. |
| 2013/0057404 | A1 | 3/2013 | Thibault |
| 2013/0057405 | A1 | 3/2013 | Seelman et al. |
| 2013/0079931 | A1 | 3/2013 | Wanchoo et al. |
| 2013/0170532 | A1 | 7/2013 | Marozsak et al. |
| 2013/0257611 | A1 | 10/2013 | Lamb et al. |
| 2013/0316583 | A1 | 11/2013 | Scherer et al. |
| 2014/0070922 | A1 | 3/2014 | Davis |
| 2014/0097953 | A1 | 4/2014 | Jelveh et al. |
| 2014/0244047 | A1 | 8/2014 | Oh et al. |
| 2014/0265633 | A1 | 9/2014 | O |
| 2014/0266669 | A1 | 9/2014 | Fadell et al. |
| 2014/0267716 | A1 | 9/2014 | Child et al. |
| 2014/0340222 | A1 | 11/2014 | Thornton et al. |
| 2015/0199888 | A1 | 7/2015 | Shapira et al. |
| 2015/0256665 | A1 | 9/2015 | Pera et al. |
| 2015/0348385 | A1 | 12/2015 | Lamb et al. |
| 2015/0381227 | A1 | 12/2015 | Browning et al. |
| 2016/0044447 | A1 * | 2/2016 | Tetreault ............. H01R 31/065 439/620.21 |
| 2016/0111878 | A1 | 4/2016 | Qureshi et al. |
| 2016/0300468 | A1 | 10/2016 | Stricker et al. |
| 2017/0109984 | A1 | 4/2017 | Child et al. |
| 2017/0195625 | A1 | 7/2017 | Mahar et al. |
| 2017/0236402 | A1 | 8/2017 | McGee |
| 2018/0365943 | A1 | 12/2018 | DiPoala |
| 2019/0027875 | A1 * | 1/2019 | Parks ................. H02J 13/0005 |
| 2019/0096202 | A1 | 3/2019 | Seelman |
| 2020/0357253 | A1 | 11/2020 | Carlson et al. |
| 2021/0209907 | A1 | 7/2021 | Carlson et al. |

(56) References Cited

U.S. PATENT DOCUMENTS

| | | | |
|---|---|---|---|
| 2021/0272431 | A1 | 9/2021 | Chavady |
| 2021/0327230 | A1 | 10/2021 | Wang et al. |

FOREIGN PATENT DOCUMENTS

| | | | |
|---|---|---|---|
| DE | 20017433 | U1 | 3/2001 |
| DE | 202014000574 | U1 | 2/2014 |
| DE | 102013217366 | A1 | 11/2014 |
| EP | 1860624 | A1 | 11/2007 |
| GB | 2356077 | A | 5/2001 |
| GB | 2461815 | B | 7/2011 |
| NL | 1000644 | C2 | 12/1996 |
| WO | 2003046855 | A1 | 6/2003 |
| WO | 2016011564 | A1 | 1/2016 |
| WO | 20180011754 | A1 | 1/2018 |
| WO | 2019218050 | A1 | 11/2019 |

OTHER PUBLICATIONS

WIPO, International Searching Authority, International Search Report dated Nov. 5, 2015 in International Patent Application No. PCT/CA2015/050711.

European Search Report completed Feb. 1, 2018 for EP 15 82 4924.

WIPO, International Searching Authority, International Search Report dated Jul. 23, 2019 in International Patent Application No. PCT/CA2019/000071.

Extended Supplementary European Search Report dated May 14, 2021 for European Patent Application No. EP 19 80 3339.

WIPO, International Searching Authority, International Search Report dated Aug. 9, 2021 in International Patent Application No. PCT/CA2020/051582.

"ISC West 2019" available Apr. 17, 2019, [online], [site visited Jan. 2, 2020]. Retrieved from Internet, URL: https://www.youtube.com/watch?v=U20ki9sfQAE (Year: 2019).

"AIS25BATR" from Digikey, https://www.digikey.com/en/products/detail/stmicroelectronics/AIS25BATR/16669231 archived page dated Aug. 27, 2022.

"AIS25BA: ultralow noise, wide bandwidth, 3-axis accelerometer with TDM interface for automotive applications", datasheet, dated Jul. 18, 2022.

"MMC5603NJ" from Memsic, https://www.memsic.com/magnetometer-2, archived page dated Oct. 2, 2022.

"MMC5603NJ:±30 Gauss, Monolithic, High Performance, Low Cost 3-axis Magnetic Sensor", datasheet, dated Jan. 17, 2022.

Resideo, "5870API-WH—Wireless Indoor Asset Protection Sensor, White", https://www.resideo.com/us/en/pro/products/security/proseries/security-and-safety/asset-protection/5870api-wh-wireless-indoor-asset-protection-sensor-white-5870api-wh/, archived article dated Dec. 21, 2021.

"5870API Wireless Indoor Asset Protection", Honeywell Home, dated 2019.

Extended European search report dated Dec. 11, 2023 for European Patent Application No. 20961779.4.

* cited by examiner

METHOD OF INSTALLING A SECURITY ALARM SYSTEM AND WIRELESS ACCESS POINT

BACKGROUND OF THE INVENTION

Field of the Invention

The present invention relates to a method of installing a security alarm system or wireless access point and, in particular, to a method of installing a security alarm system or wireless access point wherein one of a doorbell chime, a smoke detector, a carbon monoxide detector and a thermostat is replaced with the security alarm system or wireless access point. There is also provided a method of converting a wired doorbell assembly into a security alarm system or a wireless access point.

Description of the Related Art

U.S. Pat. No. 7,135,959 which issued on Nov. 14, 2006, to Wagner et al. discloses an apparatus and method for wireless doorbell and security control panel interaction. The system includes a wireless doorbell, a security control panel, and at least one control panel activation device having a transmitter and a manually activated switch or button. The control panel is in communication with the at least one control panel activation device by way of the transmitter. The control panel includes a receiver for receiving signals transmitted from the at least one control panel activation device via the transmitter. A security keypad having a speaker device for broadcasting an alarm or message related to functions of the security system is in communication with the control panel as well. At least one auxiliary security device is also in communication with the control panel. The auxiliary security device may include an assortment of devices that perform ancillary functions that enhance the functionality of the security control panel.

United States Patent Application Publication No. 2014/0070922 to Davis discloses a system, apparatus, and method specially adapted to replace conventional doorbell systems in environments having access to wireless networks connected to the Internet, which provides wireless communication between the doorbell button unit and mobile devices without requiring additional or different power sources or wiring, aside from pre-existing, conventional doorbell wiring.

SUMMARY OF THE INVENTION

There is accordingly provided a method of converting one of a doorbell chime, a smoke detector, a carbon monoxide detector and a thermostat in an existing location of a building to a wireless access point. The method includes disconnecting the one of the doorbell chime, the smoke detector, the carbon monoxide detector and the thermostat from existing wiring thereof. The method includes removing from the existing location the one of the doorbell chime, the smoke detector, the carbon monoxide detector and the thermostat. The method includes installing in the existing location the wireless access point. The method includes connecting the wireless access point to the existing wiring so as to receive power therefrom.

There is also provided a method of installing a wireless access point in a building having at least one of a doorbell chime, a smoke detector, a carbon monoxide detector, and a thermostat. The method includes replacing the at least one of the doorbell chime, the smoke detector, the carbon monoxide detector, and the thermostat with the wireless access point.

There is additionally provided a method of installing a wireless access point so as to inhibit detection thereof within the interior of a home. The method includes disconnecting one of a doorbell chime, a smoke detector and a carbon monoxide detector of a building from existing wiring thereof. The doorbell chime, the smoke detector and the carbon monoxide detector are in central and elevated locations of the home. The method includes removing from one or more existing locations thereof the one or more said doorbell chime, said smoke detector and said carbon monoxide detector. The method includes installing in said one or more existing locations the wireless access point. The method includes connecting said existing wiring to said wireless access point so as to receive power therefrom. The method includes providing the wireless access point with backup power in the form of a battery. The method includes operatively connecting a plurality of door sensors, a plurality of window sensors and one or more motion detectors to the wireless access point.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
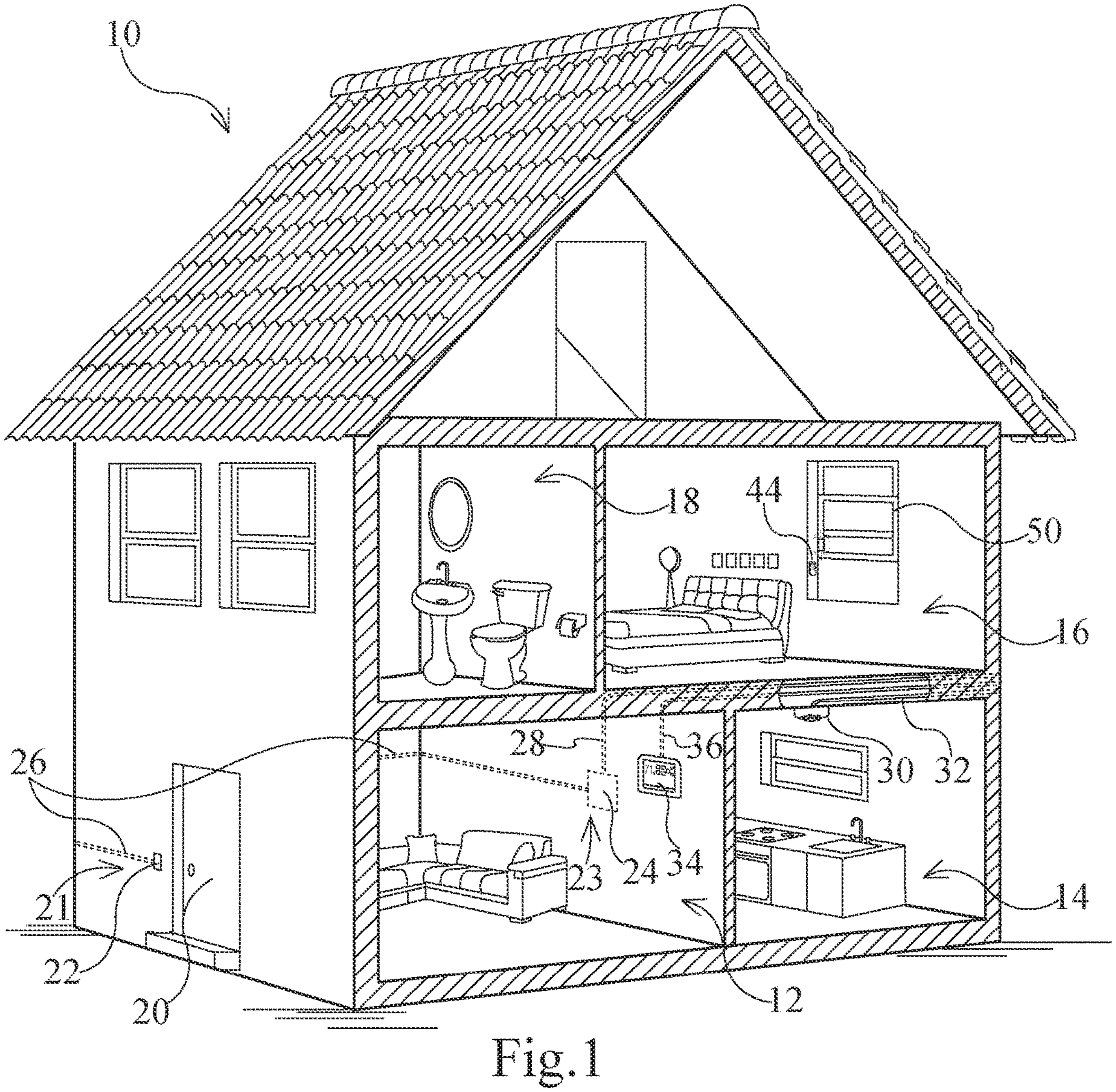
FIG. 1 is a perspective, partially exploded view of a house without a security alarm system.

FIG. 1 shows a building which, in this example, is a house 10 having a living room 12, a kitchen 14, a bedroom 16, and a bathroom 18. The house 10 also has a front door 20 and a wired doorbell assembly 21. The doorbell assembly includes a doorbell actuator or button 22 adjacent to the front door 20. The doorbell assembly 21 includes a doorbell chime 24 wired to the doorbell button 22. The doorbell chime 24 is also wired for power by wiring 28. The doorbell button 22 and the doorbell chime are generally conventional. The house also has a smoke and/or carbon dioxide detector 30 which is wired for power by wiring 32 as well as a thermostat 34 which is wired for power by a wiring 36. The a smoke and/or carbon dioxide detector 30 and thermostat are generally conventional.

Figure 2:
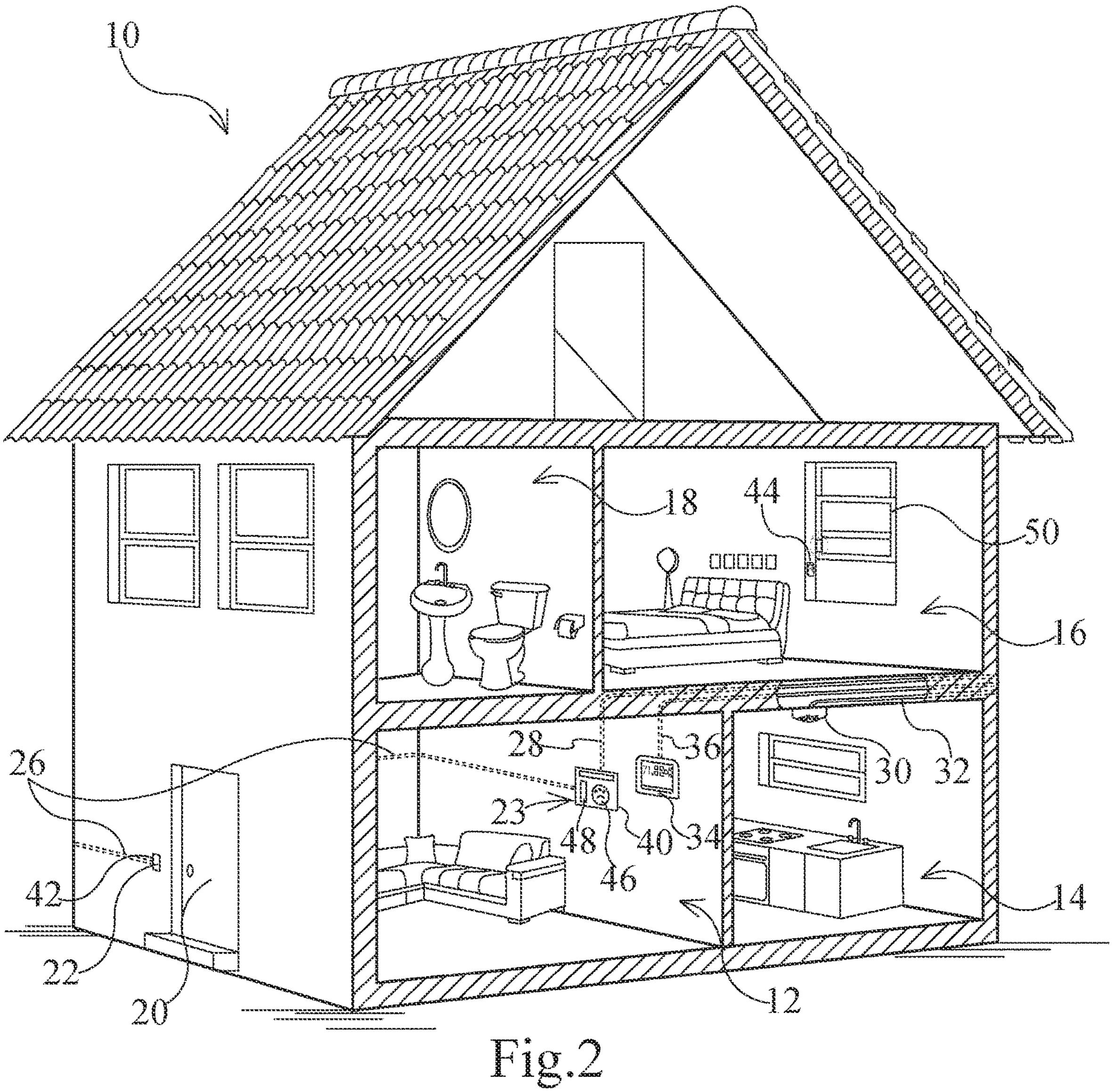
FIG. 2 is a perspective, partially exploded view of the house of FIG. 1 provided with a security alarm system installed according to a first method.

A security alarm system may be installed in the house 10 according to a first method, as shown in FIG. 2. The security alarm system generally comprises a security alarm or control panel 40, a doorbell camera 42, and a plurality of sensors, for example, proximity sensor 44. The doorbell camera is a video camera in this example. The doorbell chime 24, shown in FIG. 1, is replaced with the security control panel 40 when the security system is installed. This replacement is desirable because a doorbell chime is typically in an existing, centralized location 23 in the house 10 which is a suitable for a wireless receiver/transmitter. As seen in FIG. 1, the existing location is an elevated location. Furthermore, the existing wiring 28 which was previously used to power the doorbell chime 24, as shown in FIG. 1, may be used to power the security control panel 40, as shown in FIG. 2. The security control panel 40 may also be provided with a battery 46 to provide backup power to at least one of the security alarm system and the doorbell camera 42, and to protect the at least one of the security alarm system and the doorbell camera from power outages.

The security control panel 40 is wired to the doorbell button 22 and the doorbell camera 42 by the existing wiring 26 which was previously used to wire the doorbell chime 24, as shown in FIG. 1, to the doorbell button 22. Referring back to FIG. 2, the security control panel 40 includes a speaker 48 which broadcasts a chime when the doorbell button 22 is rung. The speaker can also broadcast an alarm or other message related to the functionality of the security alarm system. The security control panel 40 may further communicate wirelessly with a handheld device to remotely provide a homeowner with information regarding the status of the security alarm system.

There is also a plurality of sensors as shown, for example, by proximity sensor 44 which functions as a window sensor for a window 50 in the security alarm system. The proximity sensor 44 may be similar to the type disclosed in U.S. Pat. No. 9,905,099 which issued on Feb. 27, 2018, to Carlson et al. and the full disclosure of which is incorporated herein by reference. In this example, the proximity sensor 44 communicates wirelessly with the security control panel 40. However, in other examples, the proximity sensor may be wired to the security control panel 40. It will be understood by a person skilled in the art that the security alarm system may further include additional proximity sensors, which respectively function as window sensors or doors sensors, as well as motion sensors which sense movement in the house 10.

Figure 3:
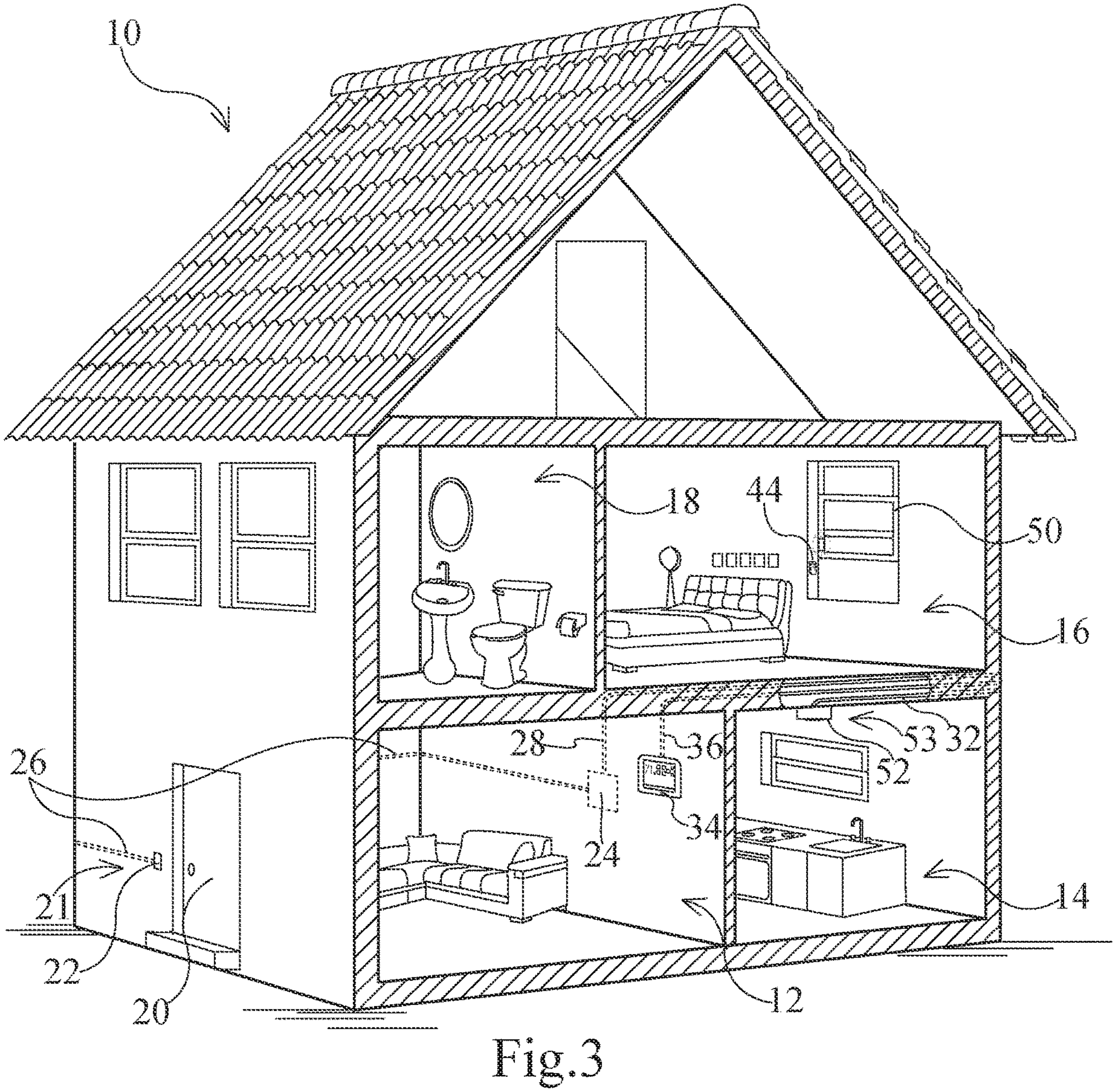
FIG. 3 is a perspective, partially exploded view of the house of FIG. 1 provided with a security alarm system installed according to a second method.

A security alarm system may also be installed in the house 10 according to a second method as shown in FIG. 3. The security alarm system generally comprises a security control panel 52 and a plurality of sensors as shown, for example, by proximity sensor 44. The smoke detector 30, shown in FIG. 1, is replaced with the security control panel 52 when the security system is installed. This replacement is desirable because a smoke detector is typically in an existing, centralized location 53 in the house 10 which is a suitable for a wireless receiver/transmitter. Furthermore, the existing wiring 32 which was previously used to power the smoke detector 30, as shown in FIG. 1, may be used to power the security control panel 52. The security control panel 52 may also be provided with a battery (not shown) to provide backup power. The security control panel 52 may further be provided with a speaker (not shown) which can broadcast an alarm or other message related to the functionality of the security alarm system. The security control panel 52 may additionally communicate wirelessly with a handheld device to remotely provide a homeowner with information regarding the status of the security alarm system.

In this example, the proximity sensor 44 communicates wirelessly with the security control panel 52. However, in other examples, the proximity sensor may be wired to the security control panel 52. It will be understood by a person skilled in the art that the security alarm system may further include additional proximity sensors, which respectively function as window sensors or doors sensors, as well as motion sensors which sense movement in the house 10.

Figure 4:
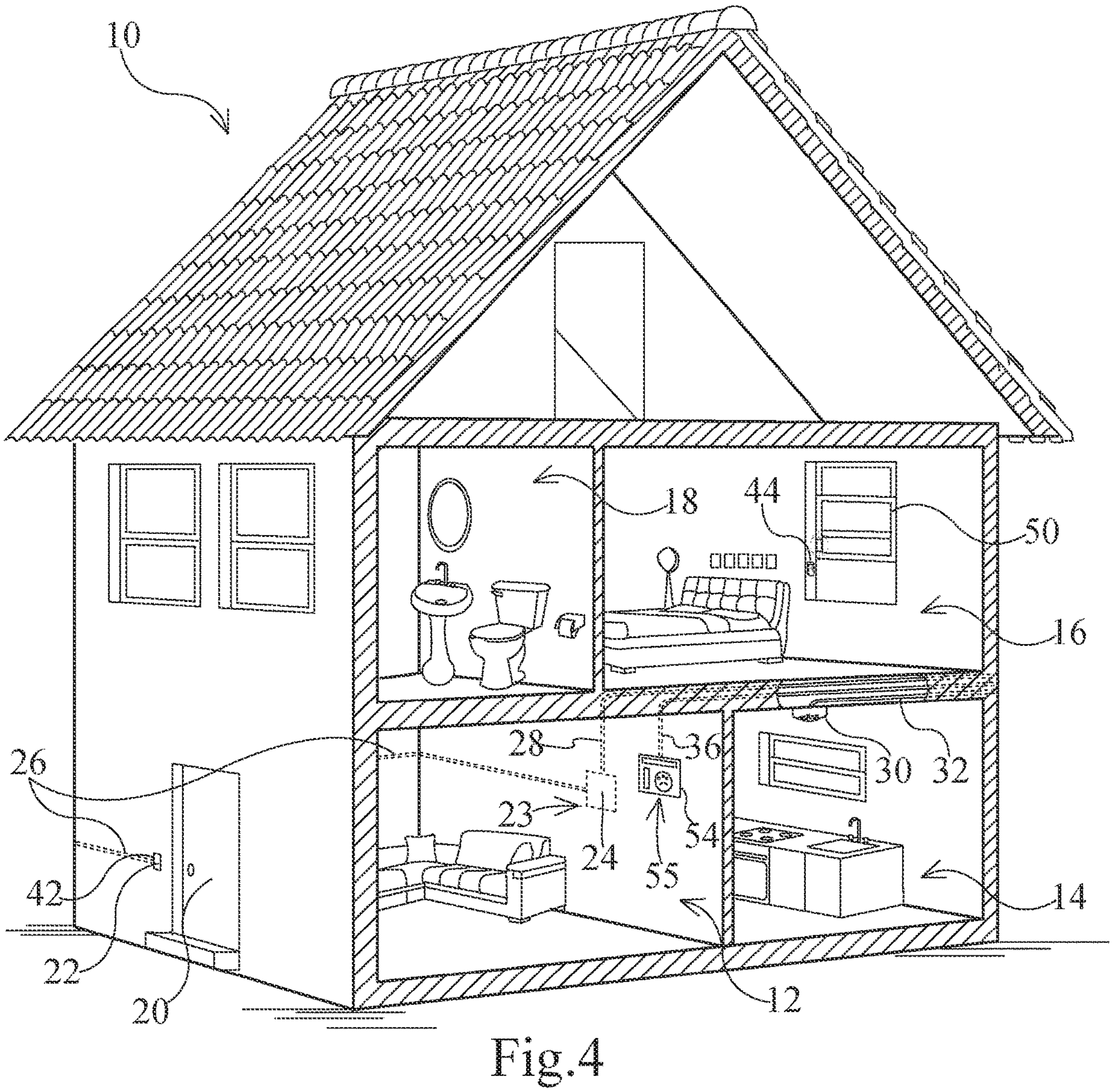
FIG. 4 is a perspective, partially exploded view of the house of FIG. 1 provided with a security alarm system installed according to a third method.

A security alarm system may further be installed in the house 10 according to a third method as shown in FIG. 4. The security alarm system generally comprises a security control panel 54 and a plurality of sensors as shown, for example, by proximity sensor 44. The thermostat 34, shown in FIG. 1, is replaced with the security control panel 54 when the security system is installed. This replacement is desirable because a thermostat is typically in an existing, centralized location 55 in the house 10 which is a suitable for a wireless receiver/transmitter. Furthermore, the existing wiring 36 which was previously used to power the thermostat 34, as shown in FIG. 1, may be used to power the security control panel 54. The security control panel may also be provided with a battery (not shown) to provide backup power. The security control panel 54 may further be provided with a speaker (not shown) which can broadcast an alarm or other message related to the functionality of the security alarm system. The security control panel may additionally also communicate wirelessly with a handheld device to remotely provide a homeowner with information regarding the status of the security alarm system.

In this example, the proximity sensor 44 communicates wirelessly with the security control panel 54. However, in other examples, the proximity sensor may be wired to the security control panel. It will be understood by a person skilled in the art that the security alarm system may further include additional proximity sensors, which respectively function as window sensors or doors sensors, as well as motion sensors which sense movement in the house 10.

It will be understood by a person skilled in the art that in the examples disclosed herein a doorbell chime or smoke and/or carbon monoxide detector or thermostat are replaced with a security control panel. However, in other examples the doorbell chime, smoke and/or carbon monoxide detector and/or thermostat may be replaced with another component or peripheral of a security alarm system such as a motion detector, wireless receiver/transmitter, or signal repeater.

Figure 5:
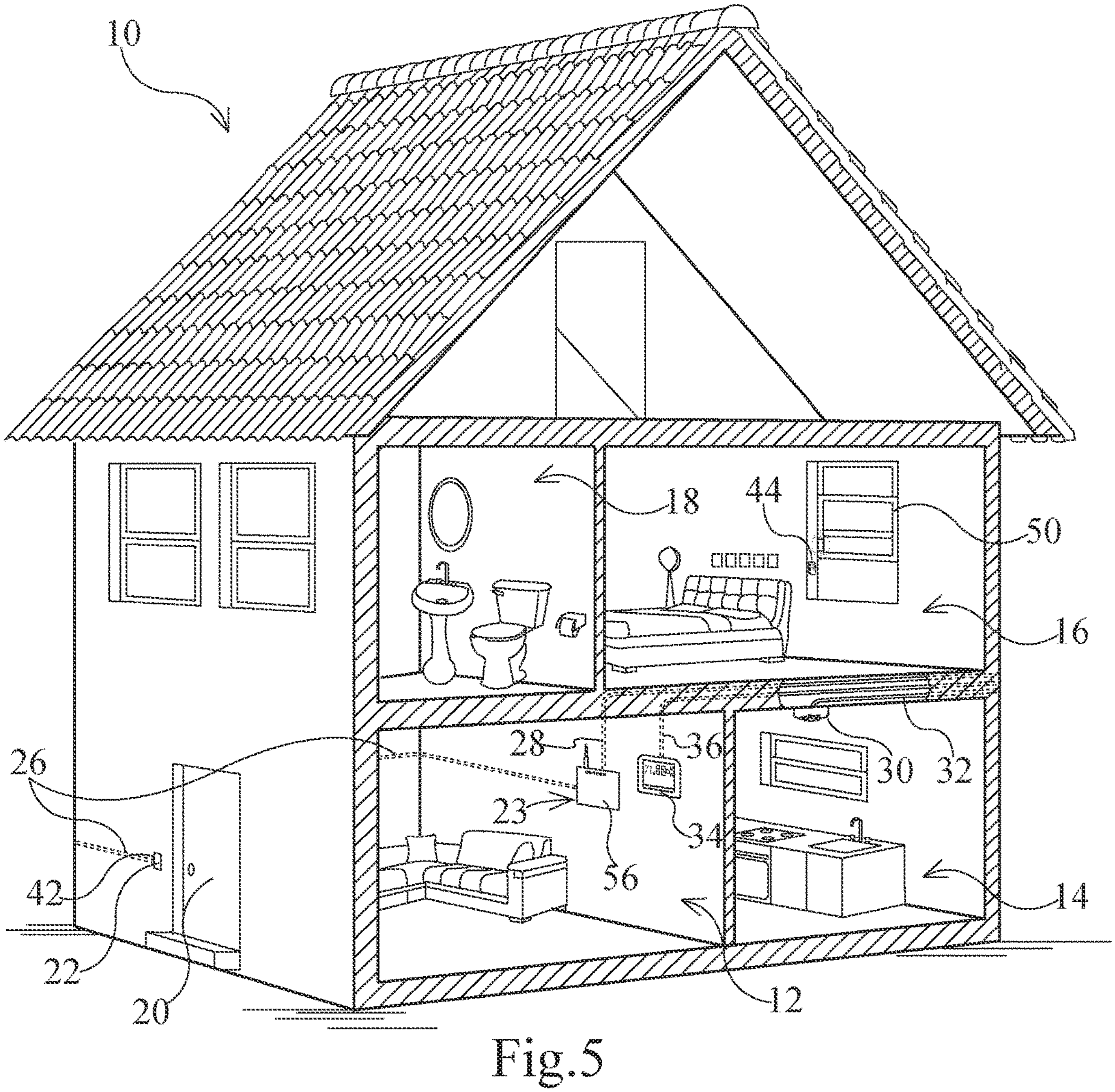
FIG. 5 is a perspective, partially exploded view of the house of FIG. 1 provided with a wireless access point installed according to a first method.

FIG. 5 is substantially similar to the system and method described for FIG. 2 with the exception that a receiver/transmitter, in this example a wireless access point 56 (e.g. Wi-Fi™ access point) replaces the doorbell chime 24 of FIG. 1 and couples to existing wiring 28 in this case.

Figure 6:
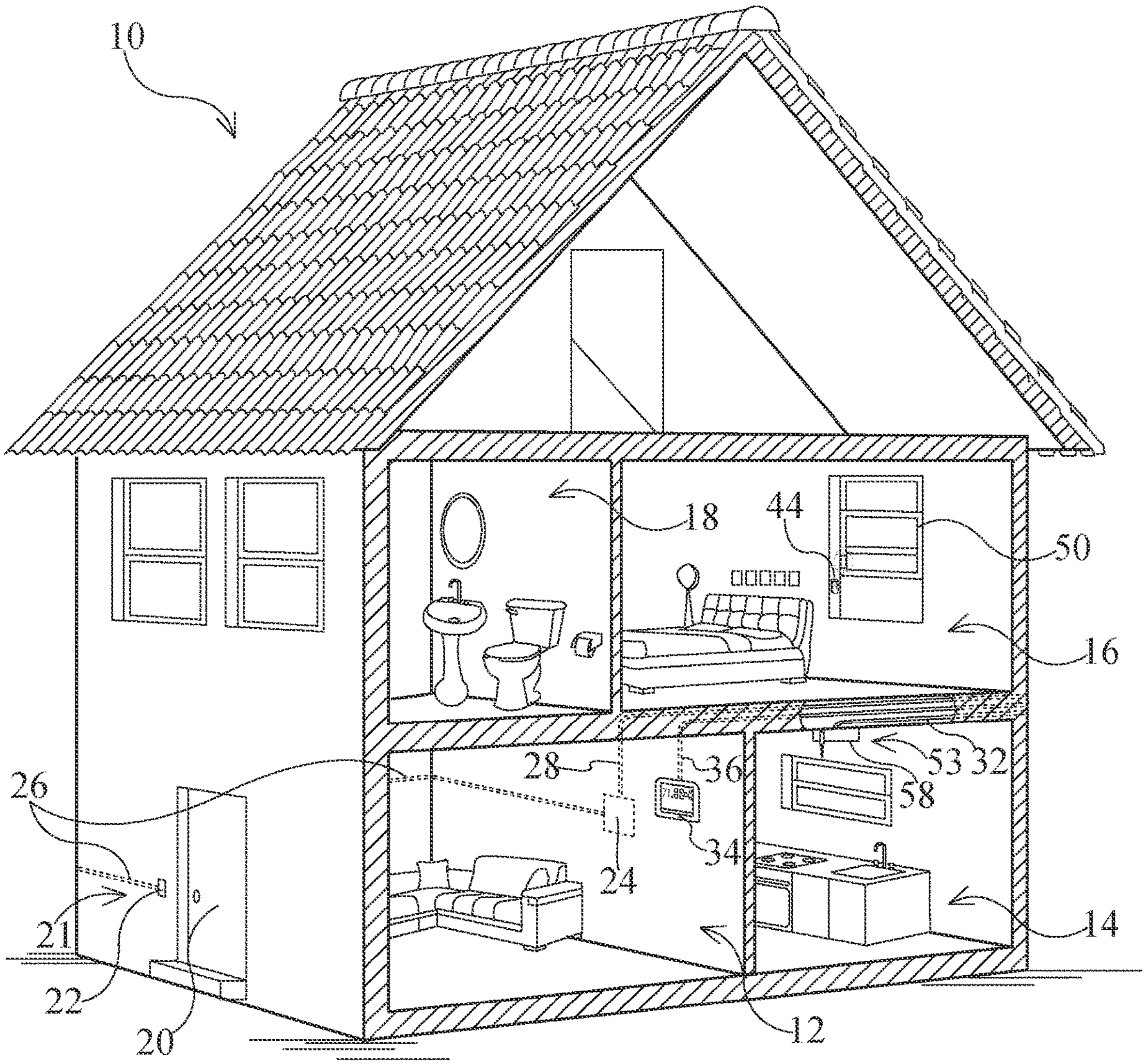
FIG. 6 is a perspective, partially exploded view of the house of FIG. 1 provided with a wireless access point installed according to a second method.

FIG. 6 is substantially similar to the system and method described for FIG. 3 with the exception that a receiver/transmitter, in this example a wireless access point 58 (e.g. Wi-Fi™ access point) replaces the smoke detector 30 of Figure land couples to existing wiring 32 in this case.

Figure 7:
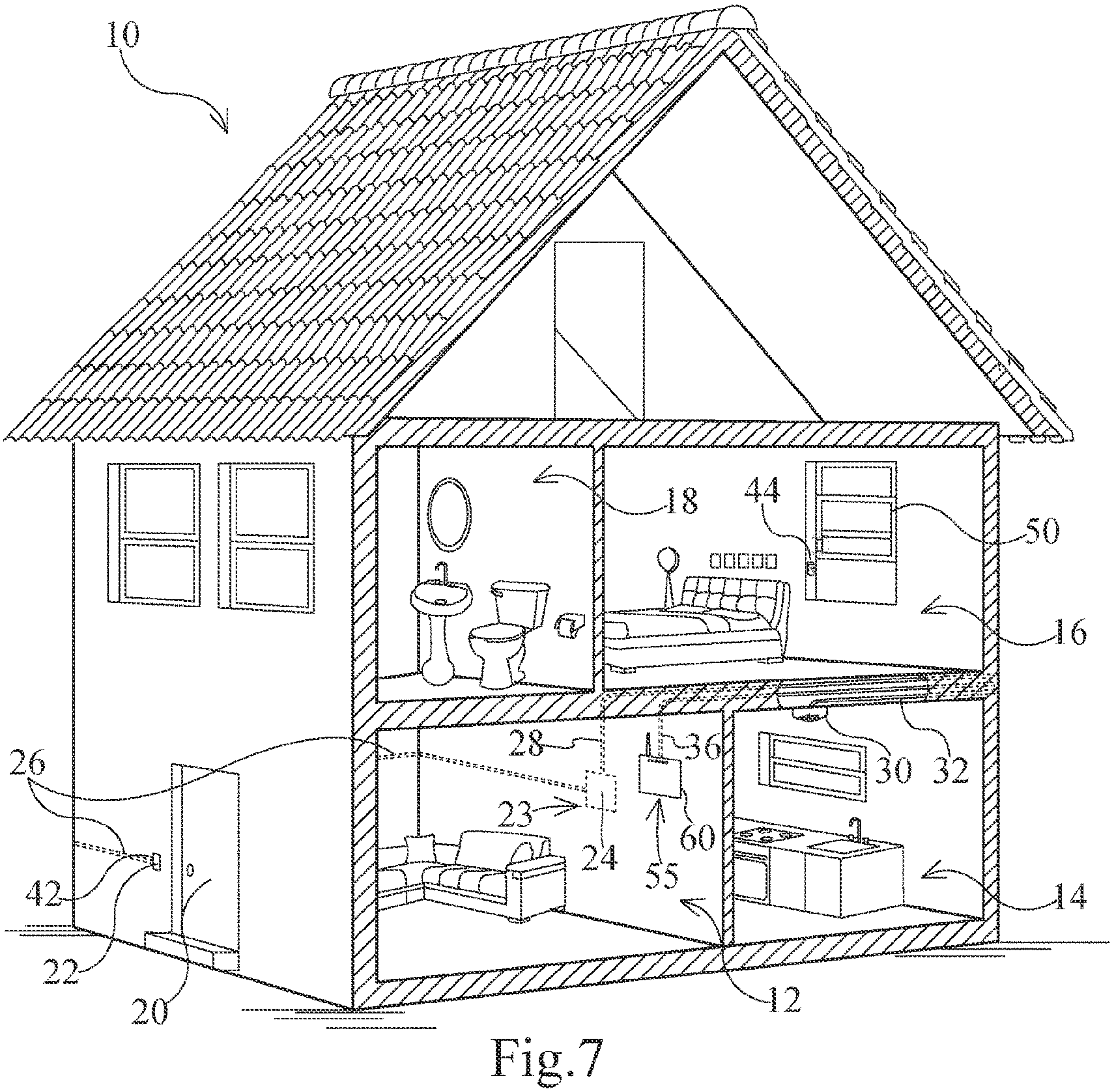
FIG. 7 is a perspective, partially exploded view of the house of FIG. 1 provided with a wireless access point installed according to a third method.

FIG. 7 is substantially similar to the system and method described for FIG. 4 with the exception that a receiver/transmitter, in this example a wireless access point 60 (e.g. Wi-Fi™ access point) replaces the thermostat 34 of Figure land couples to existing wiring 36 in this case.

ADDITIONAL DESCRIPTION

Examples of methods of installing security alarm systems, converting wired doorbell assembly into security alarm systems, and installing wireless access points have been described. The following clauses are offered as further description.

(1) A method of installing a security alarm system in a building having a doorbell and a doorbell chime, the method comprising: replacing the doorbell chime with a security control panel; connecting the security panel to the doorbell using existing wiring previously used to connect the doorbell chime to the doorbell.

(2) The method of clause 1 further including: installing a doorbell camera; and connecting the security panel to the doorbell camera using existing wiring previously used to connect the doorbell chime to the doorbell.

(3) A method of installing a security alarm system in a building having a doorbell chime, the method comprising replacing the doorbell chime with a security control panel or another component of a security alarm system.

(4) A method of installing a security alarm system in a building having a smoke detector, the method comprising replacing the smoke detector with a security control panel or another component of a security alarm system.

(5) A method of installing a security alarm system in a building having a carbon monoxide detector, the method comprising replacing the carbon monoxide detector with a security control panel or another component of a security alarm system.

(6) A method of installing a security alarm system in a building having a thermostat detector, the method comprising replacing the thermostat with a security control panel or another component of a security alarm system.

(7) A method of converting a wired doorbell assembly into a security alarm system for a building, the wired doorbell assembly including a doorbell chime installed in an existing location of the building and including a doorbell button, and the method comprising: disconnecting said doorbell chime from existing wiring thereof; removing from said existing location said doorbell chime; installing in said existing location a security control panel or other component of the security alarm system; connecting said security control panel or other said component of the security alarm system to said existing wiring so as to receive power therefrom; and providing said security control panel or other said component of the security alarm system with a speaker which broadcasts a chime when the doorbell button is pressed.

(8) The method of clause 7 further including: installing a doorbell camera; and connecting said security control panel or other said component of the security alarm system to the doorbell camera using said existing wiring.

(9) The method of clause 7 further including: providing said security control panel or other said component of the security alarm system with a battery to provide backup power to the security alarm system.

(10) The method of clause 8 further including: providing said security control panel or other said component of the security alarm system with a battery to provide backup power to the doorbell camera.

(11) The method of clause 8 further including: providing said security control panel or other said component of the security alarm system with a battery to protect the doorbell camera from power outages.

(12) A method of installing a security alarm system in a building having a doorbell button and a doorbell chime, the method comprising: replacing the doorbell chime with a security control panel or other component of the security alarm system; and connecting said security control panel or other said component of the security alarm system to the doorbell button using existing wiring previously used to connect the doorbell chime to the doorbell button.

(13) The method of clause 12 further including: installing a doorbell camera; and connecting said security control panel or other said component of the security alarm system to the doorbell camera using existing wiring previously used to connect the doorbell chime to the doorbell button.

(14) The method of clause 12 further including: providing said security control panel or other said component of the security alarm system with a battery to provide backup power to the doorbell camera.

(15) The method of clause 12 further including: providing said security control panel or other said component of the security alarm system with a battery to protect the doorbell camera from power outages.

(16) A method of installing a security alarm system in a building having one of a doorbell chime, a smoke detector, a carbon monoxide detector and a thermostat in an existing location, the method comprising: disconnecting said one of the doorbell chime, the smoke detector, the carbon monoxide detector and the thermostat from existing wiring thereof; removing from said existing location said one of the doorbell chime, the smoke detector, the carbon monoxide detector and the thermostat; installing in said existing location a security control panel or other component of the security alarm system; and connecting said existing wiring to said security control panel or other said component of the security alarm system so as to receive power therefrom.

(17) A method of installing a security alarm system in a building having at least one of a doorbell chime, a smoke detector, a carbon monoxide detector, and a thermostat, the method comprising replacing the at least one of the doorbell chime, the smoke detector, the carbon monoxide detector and the thermostat with a security control panel or another component of the security alarm system.

(18) A method of converting one of a doorbell chime, a smoke detector, a carbon monoxide detector and a thermostat in an existing location of a building to a wireless access point, the method comprising: disconnecting said one of the doorbell chime, the smoke detector, the carbon monoxide detector and the thermostat from existing wiring thereof; removing from said existing location said one of the doorbell chime, the smoke detector, the carbon monoxide detector and the thermostat; installing in said existing location the wireless access point; and connecting the wireless access point to said existing wiring so as to receive power therefrom.

(19) The method of clause 18 further including: selecting said one of the doorbell chime, the smoke detector, the carbon monoxide detector and the thermostat for removal from a centralized said location.

(20) A method of installing a wireless access point in a building having at least one of a doorbell chime, a smoke detector, a carbon monoxide detector, and a thermostat, the method comprising replacing the at least one of the doorbell chime, the smoke detector, the carbon monoxide detector, and the thermostat with the wireless access point.

(21) A method of installing a security alarm system so as to inhibit detection thereof, the method comprising: disconnecting one or more of a doorbell chime, a smoke detector, a carbon monoxide detector and a thermostat of a building from existing wiring thereof; removing from one or more existing locations thereof the one or more said doorbell chime, said smoke detector, said carbon monoxide detector and said thermostat; installing in said one or more existing locations one or more of a security control panel and other component of the security alarm system; and connecting said existing wiring to said one or more of said security control panel and other said component of the security alarm system so as to receive power therefrom.

It will also be understood by a person skilled in the art that many of the details provided above are by way of example only, and are not intended to limit the scope of the invention which is to be determined with reference to the following claims.

What is claimed is:

1. A method of installing a wireless access point so as to inhibit detection thereof within the interior of a home, the method comprising:

disconnecting one of a doorbell chime, a smoke detector and a carbon monoxide detector of a building from existing wiring thereof, wherein the doorbell chime, the smoke detector and the carbon monoxide detector are in central and elevated locations of the home;

removing from one or more existing locations thereof the one or more said doorbell chime, said smoke detector and said carbon monoxide detector;

installing in said one or more existing locations the wireless access point;

connecting said existing wiring to said wireless access point so as to receive power therefrom;

providing the wireless access point with backup power in the form of a battery; and operatively connecting a plurality of door sensors, a plurality of window sensors and one or more motion detectors to the wireless access point.

2. The method as claimed in claim 1 further including:

providing said wireless access point with a speaker which broadcasts a chime when a doorbell button is pressed.

3. The method as claimed in claim 1 further including:

installing a doorbell camera; and connecting said wireless access point to the doorbell camera using said existing wiring.

4. The method as claimed in claim 1 further including:

enabling said wireless access point to communicate wirelessly with a handheld device so as to provide thereto information regarding the status of the wireless access point.

5. The method as claimed in claim 1, further including:

replacing the doorbell chime with a motion detector.

6. The method as claimed in claim 1, further including:

replacing the doorbell chime with a signal repeater.

7. The method as claimed in claim 1 further including:

providing said wireless access point with a speaker which broadcasts an alarm or other message related to the functionality of the wireless access point.

8. The method of claim 1, wherein the one or more existing locations promote communication between the wireless access point and the plurality of door sensors, the plurality of window sensors and the one or more motion detectors.

9. The method of claim 1, wherein the wireless access point is positioned to promote wireless communication with the plurality of door sensors, the plurality of window sensors and the one or more motion detectors.

10. The method of claim 1, including providing the wireless access point with a wireless receiver or transmitter.

11. The method of claim 1, including communicating with the plurality of door sensors, the plurality of window sensors and the one or more motion detectors via the wireless access point.

12. The method of claim 1, wherein the one or more existing locations are spaced-apart from doors of the building.

13. The method of claim 1, wherein the one or more existing locations are inwardly spaced from doors of the building.

14. The method of claim 1, wherein the one or more existing locations are spaced-apart from windows of the building.

15. The method of claim 1, wherein the one or more existing locations are inwardly spaced from windows of the building.

16. The method of claim 1, wherein the one or more existing locations are positioned along or adjacent a central wall of the building.

17. The method of claim 1, wherein the one or more existing locations are positioned inwardly from outer sides of the building.

18. The method of claim 1, wherein the one or more existing locations are positioned along a ground floor of the building.

19. The method of claim 1, wherein the one or more existing locations are positioned along or adjacent a ceiling of a ground floor of the building.

* * * * *